Oct. 18, 1949.　　H. P. ROTH ET AL　　2,485,113
ISOBARIC CONTROL VALVE
Filed Sept. 4, 1945
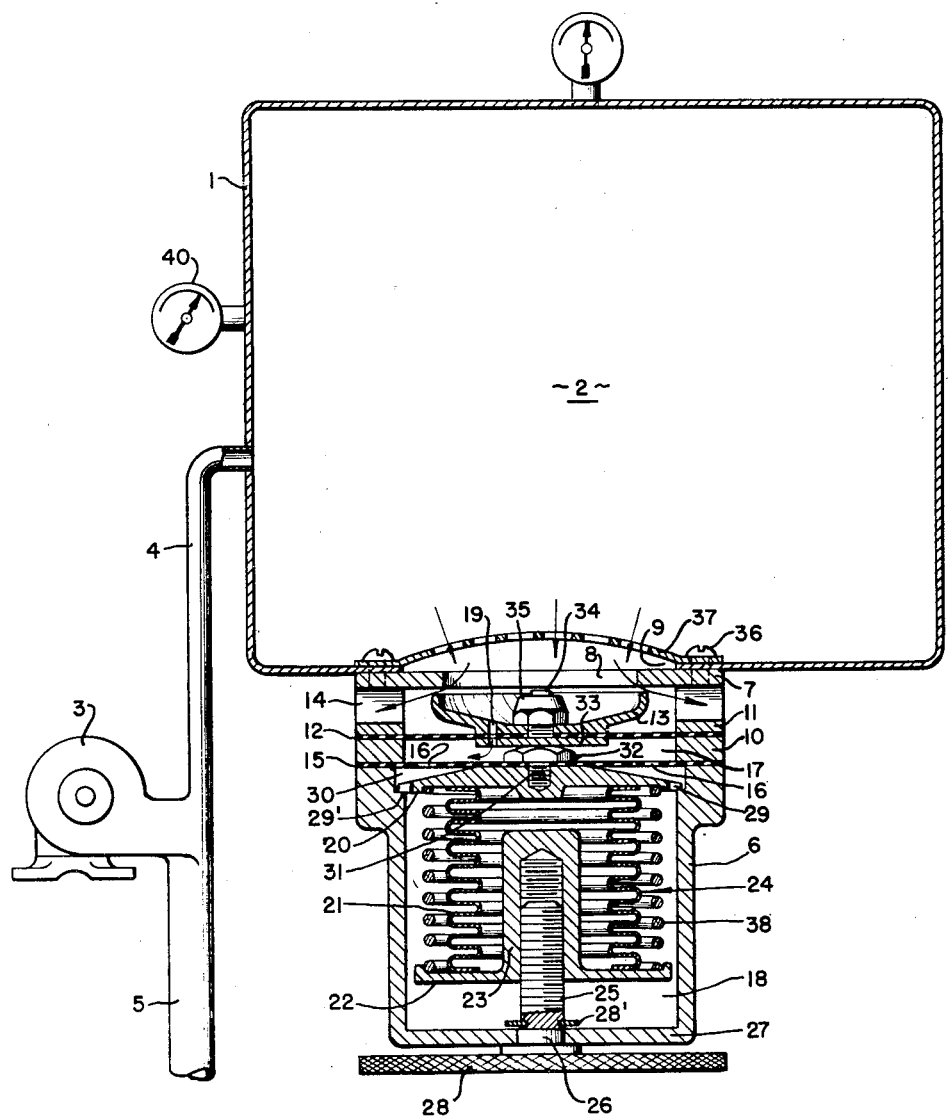
INVENTORS.
HERMAN P. ROTH
WALTER HERMAN WARSTLER
BY
ATTORNEY Patented Oct. 18, 1949

2,485,113

UNITED STATES PATENT OFFICE 2,485,113

ISOBARIC CONTROL VALVE

Herman P. Roth, Redondo Beach, and Walter Herman Warstler, Inglewood, Calif., assignors to The Garrett Corporation, Airesearch Manufacturing Company division, Los Angeles, Calif., a corporation of California Application September 4, 1945, Serial No. 614,268

19 Claims. (Cl. 98—1.5)

This invention relates to the control of pressure in a ventilated chamber such as the cabin of an airplane, and has as its general object to provide a control device adapted to maintain a substantially constant absolute pressure within a volume chamber.

One use of the invention is in the pressurizing of separate compartments of an aircraft cabin, and makes it possible to maintain different absolute pressures in the various compartments, in accordance with the desires or needs of the individual occupants. More particularly, the invention aims to provide for the separate control of pressures in a number of relatively small compartments, all of which are supplied and ventilated by air under pressure from a single source, such as a supercharger or ram.

Another object of the invention is to provide a relatively simple pressure control valve for maintaining an isobaric pressure condition within a chamber, the exterior of which is subject to changing pressures; and a further object is to provide such a control device which may be quickly adjusted to maintain various absolute pressure values within the chamber.

Another object of the invention is to provide an isobaric pressure control valve which may be easily applied to the outlet of a pressurized chamber adapted to control the pressure in the chamber by controlling the outflow therefrom.

Further objects and advantages of the invention will be brought out in the following part of the specification.

The drawing shows a schematic view of a ventilating system including a cross sectional showing of our improved pressure control outlet valve.

As an example of one form in which the invention may be embodied, we have shown in the drawing a schematic representation of an enclosure, indicated at 1, defining a chamber 2 to be ventilated under pressure. Air is introduced into the chamber 2 by a suitable pumping device such as the supercharger 3, through an inlet duct 4 which may comprise one branch of a duct system 5 extending to a number of like chambers.

Our improved pressure control valve comprises a casing 6 having at one end a valve seat ring 7 adapted to be sealed against the outer surface of the wall of the enclosure 1, with its inlet opening 8 registering with the outlet opening 9 of the enclosure 1. The casing 6 also includes a ring 10 which is interposed between the main body of the casing and a flange member 11 on the ring 7. A member or diaphragm 12 is clamped between the ring 10 and the flange 11, and supports a dished valve head 13, the rim of which cooperates with the valve seat ring 7 to control the flow through the valve port 8. The flange 11 is provided with discharge openings 14 for discharge to atmosphere, of the air which escapes past the valve head 13.

Clamped between the ring 10 and the main body portion of the casing 6 is a flexible bellows guide 15 having apertures 16. Between the members 15 and 12 is a space 17 which communicates through the apertures 16 with a bellows chamber 18 defined between the support member 15 and the body portion of the casing 6. An aperture 19 extending through the valve head 13 and diaphragm 12 establishes communication between the ventilated chamber 2 and the space 17. Thus the pressure within the chamber 2 is first transmitted into the space 17 and then into the bellows or control chamber 18.

If a pressure differential exists between the pressure in chamber 2 and ambient pressure, a downward force, as viewed in the drawing, will be exerted by this pressure differential acting on the effective area of valve head 13, and an upward force, as viewed in the drawing, will be exerted by this pressure differential acting on the effective area of the diaphragm 12. The effective areas of valve head 13 and diaphragm 12 are made substantially equal. Therefore, any force exerted downward by a pressure differential between the pressure in chamber 2 and ambient pressure, tending to displace valve head 13 away from valve seat ring 7, and to change the effective valve orifice area, is counteracted by an equal force applied by the same pressure differential acting upward on diaphragm 12. The position of valve head 13 in relation to valve seat ring 7 is therefore not affected by changes in pressure differential between the pressure in chamber 2 and ambient pressure but instead is governed by the action of bellows 24, which is responsive to the absolute pressure in chamber 2. The cooperative action of bellows 24 and valve head 13 in governing the absolute pressure in chamber 2 will be described hereinafter.

Mounted upon the guide 15 is a bellows head 20 to which is attached one end of a corrugated bellows wall 21. The other end of the corrugated wall 21 is attached to a bellows head 22 which has an internally threaded boss 23. The heads 20 and 22 and the corrugated wall 21 define a bellows 24 into which the boss 23 projects.

The guide 15 serves to maintain the movable head of the bellows 24 in a position coaxial with the casing 6.

An adjusting screw 25 is threaded into the boss 23 and has a shank portion 26 journaled in the end wall 27 of the casing 6. A knurled knob 28 is attached to the shank portion 26. A retaining clip 28' is recessed into the screw 25 and cooperates with the knob 28 and the wall 27 to position the screw 25 against axial movement.

The bellows head 20 has radially extending lugs 29 engageable against a shoulder 29' to limit collapsing movement of the bellows 24.

The head 20 is attached to the support member 15 by a screw 31 having a rounded head 32 which engages a flat disc head 33 on a screw 34. The screw 34 is provided with a nut 35 which cooperates with the disc head 33 to clamp the diaphragm 12 against the valve head 13.

The valve seat ring 7 is secured to the wall of the enclosure 1 by means of screws 36 extended through a grill 37 and into the ring 7. The wall of the enclosure 1 is clamped between the grill 37 and the ring 7.

A compression spring 38 acts between the heads 20 and 22 tending to separate the two heads. The force of this spring is balanced by air pressure within the chamber 18 tending to collapse the bellows. The spring force is calculated so as to be just adequate to maintain the bellows at its minimum free length (with a slight tolerance for travel) when subjected to approximately sea level pressure. The adjusting knob 28 may be utilized to adjust the position of the bellows so that the screw head 32 just makes contact with the screw head 33, without pressure, at the absolute pressure it is desired to maintain within the chamber 2. With such contact established, the flow through the opening 8 will be just sufficient to balance the inflow from the duct 4. Should the absolute pressure in the chamber 2 tend to drop below the predetermined isobaric level, the correspondingly reduced pressure in the chamber 18 would permit an additional increment of expansion of the bellows which would move the valve head 13 toward closed position, restricting the outflow between the head 13 and the valve seat 7 and thereby causing the pressure in the chamber 2 to build up until the proper isobaric level is restored.

Rotation of the adjusting knob 28 will change the absolute pressure that the valve will maintain in the chamber 2.

Adjustment for the pressure level desired may be effected by backing the bellows away from contact with the diaphragm head 33 during the initial stage of operation, and then reestablishing the contact between the heads 32 and 33 after the supercharger 3 has been in operation for a length of time. If such contact is established when an airplane is at a level of, for example, 2000 feet, the absolute pressure in the enclosure 2 will thereafter be maintained at the 2000 foot level.

To determine when the pressure in the chamber 2 is equal to ambient pressure, a sensitive pressure gauge 40, responsive to differential of pressure between ambient and interior pressure, may be applied. By rotating the knob 28 to advance the screw head 32 until a slight positive reading is indicated on the gauge 40, the occurrence of contact between the screw head 32 and screw head 33 may be accurately determined.

The valve assembly as shown is designed so that it might be mounted directly on the wall of a container made of flexible impermeable material, for instance rubberized cloth. This material would be clamped between the valve assembly and the inlet screen provided. However, any other type of inlet connection could be provided, such as a tubing or pipe connection.

We claim as our invention:

1. A device for regulating the pressure in an enclosure comprising: means defining an outlet port for the escape of air from said enclosure and a control chamber spaced from said port in which a pressure substantially the same as the pressure in said enclosure is maintained; a valve element mounted on the outlet side of said port for movement in closing direction against the flow of air through the port; differential pressure responsive means, including a movable wall, responsive to pressure differential between substantially enclosure pressure and ambient pressure, said differential pressure responsive means being associated with the valve element and adapted to balance said valve element so as to prevent same from moving in response to said pressure differential; and a device within said chamber adapted to expand in response to decrease in pressure in the chamber, and to transmit, through said expansion, valve closing movement directly to said valve element.

2. A pressure regulator for an enclosure into which a fluid is pumped under pressure, comprising: means defining an outlet port for the outflow of fluid from the enclosure; means defining a control chamber on the outlet side of said port in communication with said enclosure so as to maintain substantially enclosure pressure therein; an unbalanced valve element on the outlet side of said port mounted for movement toward said port for restricting the outflow of fluid from the enclosure; differential pressure responsive means, including a movable wall, responsive to pressure differential between substantially enclosure pressure and ambient pressure, said differential pressure responsive means being adapted to act on the valve element and to substantially balance said valve element so as to prevent same from moving in response to said pressure differential; and a device responsive to the pressure in said chamber and adapted, as said pressure decreases, to transmit valve closing movement directly to said valve element.

3. A pressure regulator for an enclosure into which fluid is pumped under pressure, comprising: a valve casing providing a port for the outflow of air from said enclosure; a valve seat surrounding said port on the outlet side thereof; means defining a control chamber on the outlet side of said port in which pressure equal to the pressure of said enclosure is maintained; a valve element on the outlet side of said port mounted for movement toward said seat to restrict the outflow through said port; differential pressure responsive means, including a movable wall, responsive to pressure differential between substantially enclosure pressure and ambient pressure, said differential pressure responsive means being connected to the valve element and being adapted to balance said valve element so as to prevent same from moving in response to said pressure differential; and a device in said chamber responsive to the pressure therein and adapted as said pressure decreases to expand and transmit valve closing movement to said valve element.

4. A pressure regulator for an enclosure, comprising: means defining a port for the outflow of fluid from said enclosure; means defining a control chamber on the outlet side of said port in communication with said enclosure so that there may be maintained a pressure in said chamber which is substantially the same as enclosure pressure; a valve head on the outlet side of said port, movable against the outflow therethrough for restricting said outflow; means yieldingly supporting said valve head for such flow restricting movement, said means being responsive to variations in the differential between enclosure pressure and ambient pressure for balancing said valve head; an expansible bellows in said chamber having a head movable to transmit valve closing movement to said valve head in response to decrease in pressure in said chamber; and means adjustably connecting the other end of said bellows to said valve casing.

5. A pressure regulator as defined in claim 4, wherein said adjustable connection comprises a screw rotatably mounted in the end of said valve casing and threaded into said other end of the bellows.

6. A pressure regulator for an enclosure into which fluid is pumped under pressure, comprising: a valve seat member defining a valve port for the outflow of fluid from said enclosure; a valve casing defining a control chamber on the outlet side of said port, in which substantially the pressure of said enclosure is maintained, said valve casing being provided with exhaust openings to permit the exhaust of air to atmosphere; a valve head disposed on the outlet side of said port and cooperable therewith to control the flow therethrough; a diaphragm on which said head is yieldingly mounted, said diaphragm and valve head having an opening therethrough for transmission of enclosure pressure to said control chamber; an expansible bellows in said control chamber having a movable head for engagement with said valve head to transmit closing movement thereto in response to decrease in pressure in said control chamber; an internally threaded boss on the other end of said bellows, extending into the interior of the bellows; a compression spring under compression between said head and said other end of said bellows for urging said bellows head in valve closing direction; and an adjusting screw rotatably mounted in the end of the valve casing and threaded into said threaded boss for adjusting the position of said other end of the bellows.

7. A pressure regulator for an enclosure into which fluid is pumped under pressure, comprising: a valve chamber providing a port for the outflow of fluid from said enclosure, a seat surrounding said port on the outlet side thereof; means defining a control chamber on the outlet side of said port in which substantially the pressure of said enclosure is maintained, and a discharge port for the outflow of fluid from said valve chamber; differential pressure responsive means comprising a diaphragm disposed between said discharge port and said control chamber; a head mounted upon said diaphragm for movement toward said valve seat to restrict the outflow through said valve port, said diaphragm being subjected on opposite sides to pressure in said enclosure and to ambient pressure, and responsive to changes in the differential between said enclosure and ambient pressure, and adapted to substantially balance the valve head so as to prevent same from moving in response to said pressure differential; and a pressure responsive device in said control chamber adapted, in response to a decrease in pressure in said chamber, to expand and transmit valve closing movement to said valve element.

8. A pressure regulator for an enclosure into which a fluid is pumped under pressure, comprising: a valve casing providing a passage, including a port, for the outflow of air from the enclosure to atmosphere and a control chamber on the outlet side of said port in which substantially the pressure of said enclosure is maintained; a valve head located on the outlet side of said port and cooperating therewith to restrict the flow therethrough; differential pressure responsive means responsive to pressure differential between substantially enclosure pressure and ambient pressure, said differential pressure responsive means comprising a diaphragm on which said valve head is mounted for movement toward said port to restrict said outflow, said differential pressure responsive means being adapted to substantially balance said valve head so as to prevent same from moving in response to said pressure differential; and a device in said control chamber adapted, in response to a decrease in pressure therein, to transmit valve closing movement through said diaphragm to said valve head.

9. A pressure regulator for an enclosure into which a fluid is pumped under pressure, comprising: a valve casing providing a port for the outflow of air from said enclosure and a control chamber on the outlet side of said port in which substantially the pressure of said enclosure is maintained; a valve head located on the outlet side of said port and cooperating therewith to restrict the flow therethrough; differential pressure responsive means responsive to pressure differential between substantially enclosure pressure and ambient pressure, said differential pressure responsive means comprising a diaphragm on which said valve head is mounted for movement toward said port to restrict said outflow and adapted to substantially balance said valve head so as to inhibit same from moving in response to said pressure differential; a flexible bellows guide mounted in said casing parallel to said diaphragm; and an evacuated bellows in said control chamber having a movable head attached to said bellows guide and adapted, in response to a decrease in pressure in said chamber, to transmit valve closing movement to said head.

10. A pressure regulator for an enclosure into which a fluid is pumped under pressure, comprising: a valve casing providing a port for the outflow of fluid from said enclosure and a control chamber on the outlet side of port in which substantially the pressure of said enclosure is maintained; a valve head on the outlet side of said port movable toward said port for restricting said outflow; a differential pressure responsive diaphragm responsive to changes in the pressure differential between substantially enclosure pressure and ambient pressure, and to which said valve head is attached, said diaphragm being adapted to substantially balance said valve head so as to prevent same from moving in response to said pressure differential; an expansible bellows in said chamber, having a head adapted to transmit valve closing pressure through said diaphragm to said valve head; and means adjustably connecting the end of said bellows opposite said bellows head to said casing.

11. A pressure regulator for an enclosure into which fluid is pumped under pressure, comprising: a valve casing defining a port for the outflow of fluid from said enclosure; means defining a control chamber on the outlet side of said port in which substantially the pressure of said enclosure is maintained; a valve head disposed on the outlet side of said port and movable toward said port against said outflow for restricting said outflow; differential pressure responsive means responsive to pressure differential between substantially enclosure pressure and ambient pressure, said differential pressure responsive means yieldingly supporting said valve head for said flow restricting movement and being adapted to substantially balance said valve head so as to prevent same from moving in response to said pressure differential; and an expansible bellows in said control chamber having at one end a head adapted to transmit valve closing pressure to said valve head and having at its other end an adjustable connection with said valve casing.

12. A pressure regulator for an enclosure into which fluid is pumped under pressure, comprising: a valve seat member defining a port for the outflow of fluid from said enclosure, said seat member being adapted to be clamped against the wall of said enclosure with said port in registry with an outlet in said wall; means defining a control chamber on the outlet side of said port, in which substantially the pressure in said enclosure is maintained; a valve head disposed on the outlet side of said port and movable toward said port to restrict the outflow therethrough; differential pressure responsive means responsive to pressure differential between substantially enclosure pressure and ambient pressure, said differential pressure responsive means yieldingly supporting said valve head for such flow restricting movement and substantially balancing said valve head so as to prevent same from moving in response to said pressure differential; a bellows in said chamber having a head for engagement with said valve head and adapted in response to decrease in pressure in said chamber to expand and cause said bellows head to transmit valve closing movement to said valve head; and an adjustable connection between the other end of said bellows and the adjacent end of said valve casing whereby the relationship between said valve head and bellows head for a given control chamber pressure may be varied.

13. A pressure regulator for an enclosure into which fluid is pumped under pressure, comprising: a valve seat member defining a valve port for the outflow of fluid from said enclosure; a valve casing defining a control chamber on the outlet side of said port, in which substantially the pressure of said enclosure is maintained, there being means for the passage of air, exhausted from said port, to atmosphere; a valve head disposed on the outlet side of said port and cooperable therewith to control the flow therethrough; a diaphragm on which said head is yieldingly mounted, said diaphragm and valve head having an opening therethrough for transmission of enclosure pressure to said control chamber; an expansible bellows in said control chamber having a movable head for engagement with said valve head to transmit closing movement thereto in response to decrease in pressure in said control chamber; an internally threaded boss on the other end of said bellows, extending into the interior of the bellows; a compression spring under compression between said head and said other end of said bellows for urging said bellows head in valve closing direction; and an adjusting screw rotatably mounted in the end of the valve casing and threaded into said threaded boss for adjusting the position of said other end of the bellows.

14. In mechanism for controlling the pressure in an enclosure: enclosure pressure control means operable to control the pressure in said enclosure, including a movable fluid flow control valve element facing against the flow stream and exposed on one side to upstream pressure and on the opposite side to ambient pressure; differential pressure responsive means responsive to variations in the pressure differential between substantially the pressure on the upstream side of said valve element and ambient pressure, said differential pressure responsive means being so associated with said valve element as to be adapted to balance said valve element and prevent same from moving in response to changes in said pressure differential; means defining a chamber in communication with the pressure upstream of said valve element so that chamber pressure may be maintained at a value substantially that of said upstream pressure; and pressure responsive means, responsive to chamber pressure and operably connected to said valve element for effecting movement of said valve element against the pressure upstream thereof.

15. Mechanism for controlling the pressure in an enclosure, including: an outwardly opening unbalanced valve element adapted to be subjected on one side to pressure derived from the enclosure and to ambient pressure on the opposite side; differential pressure responsive means operably associated with said valve element, said differential pressure responsive means being adapted to be subjected and responsive to the pressure differential between that derived from said enclosure and ambient pressure so as to balance said valve element; a pressure chamber adapted to be in communication with the enclosure so that pressure in said chamber may be maintained substantially the same as enclosure pressure; and pressure responsive means responsive to enclosure pressure and operably connected to the valve element for moving same when chamber pressure changes.

16. Mechanism for controlling the pressure in an enclosure, including: an outwardly opening unbalanced valve element adapted to be subjected to enclosure pressure on one side and to ambient pressure on the opposite side; valve element balancing means associated with said valve element and adapted to be subjected and responsive to the pressure differential between that in the enclosure and ambient pressure and functioning to balance said valve element; a pressure chamber adapted to be in communication with the enclosure so that pressure in said chamber may be maintained at substantially the same value as enclosure pressure; and means responsive to enclosure pressure and operably connected to the valve element for moving same in the closing direction when chamber pressure decreases.

17. Mechanism for controlling the pressure in an enclosure, including: an outwardly opening unbalanced valve element subjected, when the device is installed, to enclosure pressure on one side and to ambient pressure on the opposite side; valve element balancing means operably connected to the valve element and subjected and responsive to variations in the pressure differential between that in the enclosure and ambient pressure; a control pressure chamber in communication with the enclosure whereby the pressure in said chamber will be maintained substantially the same as enclosure pressure; and pressure responsive means, responsive to enclosure pressure and operably connected to the valve element for moving said element in the closing direction when control chamber pressure drops.

18. Mechanism for controlling the pressure in an enclosure, including: an outwardly opening unbalanced valve element subjected, when the device is installed, to enclosure pressure on one side and to ambient pressure on the opposite side; a movable wall operably connected with said valve element and subjected on one side to substantially enclosure pressure and on the opposite side to ambient pressure, the effective areas of said valve element and said movable wall being substantially equal so that the forces acting thereon in opposite directions are substantially balanced; a pressure chamber at the outer side of the valve element, said pressure chamber being in communication with the enclosure so that the pressure in said chamber is maintained at substantially enclosure pressure; and pressure responsive means, responsive to chamber pressure and operably connected to said valve element for moving same in the closing direction upon a decrease in chamber pressure.

19. Mechanism for controlling the pressure in an enclosure, including: an enclosure pressure control means operable to control pressure in said enclosure, including an outwardly opening unbalanced element adapted to be subjected on one side to pressure derived from the enclosure and to ambient pressure on the opposite side; differential pressure responsive means operably associated with said valve element, said differential pressure responsive means being adapted to be subjected to the pressure differential between that derived from said enclosure and ambient pressure so as to balance said valve element; and pressure responsive means, responsive solely to substantially enclosure pressure, for actuating said valve element.

HERMAN P. ROTH.
WALTER HERMAN WARSTLER.

REFERENCES CITED

The following references are of record in the file of this patent:

UNITED STATES PATENTS

| Number | Name | Date |
| --- | --- | --- |
| 2,258,054 | Heidbrink | Oct. 7, 1941 |
| 2,366,146 | Martin-Hurst | Dec. 26, 1944 |
| 2,393,343 | Schroeder | Jan. 22, 1946 |
| 2,396,116 | Noxon | Mar. 5, 1946 |
| 2,399,326 | Crot | Apr. 30, 1946 |
| 2,407,258 | Del Mar | Sept. 10, 1946 |
| 2,419,707 | Cooper et al. | Apr. 29, 1947 |
| 2,449,231 | Jerger | Sept. 14, 1948 |

FOREIGN PATENTS

| Number | Country | Date |
| --- | --- | --- |
| 679,386 | France | Jan. 9, 1930 |